US011328528B2

(12) United States Patent
Yeh et al.

(10) Patent No.: US 11,328,528 B2
(45) Date of Patent: May 10, 2022

(54) SMART CARD WITH FINGERPRINT SENSING SYSTEM AND CONTROL METHOD THEREOF

(71) Applicant: ELAN MICROELECTRONICS CORPORATION, Hsin-Chu (TW)

(72) Inventors: I-Hau Yeh, Hsinchu (TW); Kuo-Lung Yen, Hsinchu (TW); Ta-Huang Liu, Hsinchu (TW); Ming-Ho Wang, Hsinchu (TW)

(73) Assignee: ELAN MICROELECTRONICS CORPORATION, Hsin-Chu (TW)

( * ) Notice: Subject to any disclaimer, the term of this patent is extended or adjusted under 35 U.S.C. 154(b) by 254 days.

(21) Appl. No.: 16/734,870

(22) Filed: Jan. 6, 2020

(65) Prior Publication Data
US 2020/0356745 A1 Nov. 12, 2020

Related U.S. Application Data

(60) Provisional application No. 62/844,091, filed on May 6, 2019.

(30) Foreign Application Priority Data
Aug. 12, 2019 (TW) ................................ 108128493

(51) Int. Cl.
*G06K 9/28* (2006.01)
*G06V 40/13* (2022.01)
(Continued)

(52) U.S. Cl.
CPC .......... *G06V 40/1306* (2022.01); *G06F 21/32* (2013.01); *G06K 19/0701* (2013.01)

(58) Field of Classification Search
CPC .......... G06K 9/00006–9/0012; G06K 9/0002; G06K 19/0707–19/0711; G06K 19/0718; G06F 21/32; G06V 40/13–40/1329
See application file for complete search history.

(56) References Cited

U.S. PATENT DOCUMENTS

| 10,679,020 | B2 * | 6/2020 | Poon | ................... G06K 7/10158 |
| 2010/0039234 | A1 * | 2/2010 | Soliven | ................... H04B 5/02 340/10.1 |

(Continued)

FOREIGN PATENT DOCUMENTS

| CN | 107111773 A | 8/2017 |
| CN | 108337913 A | 7/2018 |
| WO | WO 2017/132258 A1 | 8/2017 |

OTHER PUBLICATIONS

Office Action issued n corresponding TW Application No. 108128493 dated Jun. 10, 2020.
(Continued)

*Primary Examiner* — Brian Werner
(74) *Attorney, Agent, or Firm* — Muncy, Geissler, Olds & Lowe, P.C.

(57) ABSTRACT

A smart card with a fingerprint sensing system, includes a controller and a fingerprint sensing device. When the fingerprint sensing device senses a fingerprint to generate a fingerprint frame data, the controller enters a sleep mode, and when the controller reads the fingerprint frame data, the fingerprint sensing device stops sensing the fingerprint. Since operations of sensing the fingerprint and reading the fingerprint frame data do not occur at the same time, the high current condition can be avoided so as to decrease power consumption.

12 Claims, 9 Drawing Sheets

(51) Int. Cl.
  *G06F 21/32*   (2013.01)
  *G06K 19/07*   (2006.01)

(56) References Cited

U.S. PATENT DOCUMENTS

| | | |
|---|---|---|
| 2013/0207786 A1 | 8/2013 | Hutzler et al. |
| 2014/0052630 A1* | 2/2014 | Bona .................. G06Q 20/34 |
| | | 705/41 |
| 2016/0371527 A1 | 12/2016 | Suwald |
| 2018/0276519 A1 | 9/2018 | Benkley, III et al. |
| 2018/0349669 A1* | 12/2018 | Kim ..................... G06K 9/22 |
| 2019/0050623 A1* | 2/2019 | Lavin ................ G06K 9/00107 |

OTHER PUBLICATIONS

Japanese Examination report issued in corresponding JP Application No. 2019-186770, dated Dec. 15, 2020, 2 pages.

* cited by examiner

| Procedure / Frequency | Object | Procedure 1 | Procedure 2 |
|---|---|---|---|
| Low speed | Controller | CMD mode | |
| Middle speed | Controller | | Data transmission |
| Low speed | Sensor | Initial state | |
| High speed | Sensor | | Sensing |
| Total power consumption | | 2.2mA | 7.5mA |

| Procedure / Frequency | Object | Proceduce 1 | Proceduce 2-1 | Procedure 2-2 |
|---|---|---|---|---|
| Low speed | Controller | CMD mode | | |
| Turn off | | | Sleep mode | |
| Low speed | | | | Data transmission |
| Low speed | Sensor | Initial state | | |
| High speed | | | Sensing | |
| Turn off | | | | Sleep mode |
| Total power consumption | | 2.2mA | 2.5mA | 4.5mA |

SMART CARD WITH FINGERPRINT SENSING SYSTEM AND CONTROL METHOD THEREOF

BACKGROUND OF THE INVENTION

1. Field of the Invention

The present invention relates to a smart card with a fingerprint sensing system, and more particularly to a smart card having low power consumption, and a control method thereof.

2. Description of the Related Art

Smart cards with a fingerprint sensing system become more and more popular. The fingerprint sensing system in the smart card can be used to enroll a user's fingerprint and verify the user. In general, the smart card includes an antenna disposed therein and configured to obtain electrical power from other electronic device, such as a card reader. When the smart card is far apart from the electronic device supplying electrical power, the smart card may obtain insufficient electrical power for the fingerprint sensing system to perform certain function, such as fingerprint enrollment. For this reason, how to reduce power consumption of the smart card is an important issue in the industry.

SUMMARY OF THE INVENTION

An objective of the present invention is to provide a smart card having low power consumption, and a control method thereof.

According to the present invention, the smart card includes a controller and a fingerprint sensing device configured to sense a fingerprint to generate fingerprint frame data, and the controller obtains the fingerprint frame data from the fingerprint sensing device so as to perform fingerprint enrollment or verification. The control method of the smart card includes in a first mode, when the controller reads the fingerprint frame data, the fingerprint sensing device stops sensing the fingerprint, or when the fingerprint sensing device senses the fingerprint, the controller enters a sleep mode. As a result, the operations of sensing the fingerprint and reading the fingerprint frame data do not occur simultaneously, thereby preventing from high current and decreasing power consumption of the smart card.

In an embodiment, the fingerprint sensing device comprises a data transmission interface configured to communicate with the controller, a sensor configured to sense the fingerprint to generate the fingerprint frame data, and a memory configured to store the fingerprint frame data outputted by the sensor. The controller reads the fingerprint frame data, which is stored in the memory, through the data transmission interface, and in the first mode of the smart card, when the controller reads the fingerprint frame data, the sensor stops sensing the fingerprint.

In an embodiment, in the first mode of the smart card, the sensor compares whether a currently-sensed new fingerprint frame data is similar to an old fingerprint frame data stored in the memory, and then stores the currently-sensed new fingerprint frame data in the memory. When the currently-sensed new fingerprint frame data is not similar to the old fingerprint frame data, the sensor outputs a notice signal to the controller, then the controller reads the currently-sensed new fingerprint frame data stored in the memory in response to the notice signal.

In an embodiment, the smart card comprises a second mode. In the second mode, the fingerprint sensing device senses the fingerprint to generate a plurality of fingerprint line data which form the fingerprint frame data. When the fingerprint sensing device senses the fingerprint, the controller obtains the plurality of fingerprint line data from the fingerprint sensing device sequentially. In the second mode, the controller can read the fingerprint data while the fingerprint sensing device is sensing fingerprint, so as to increase working efficiency.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

Figure 1:
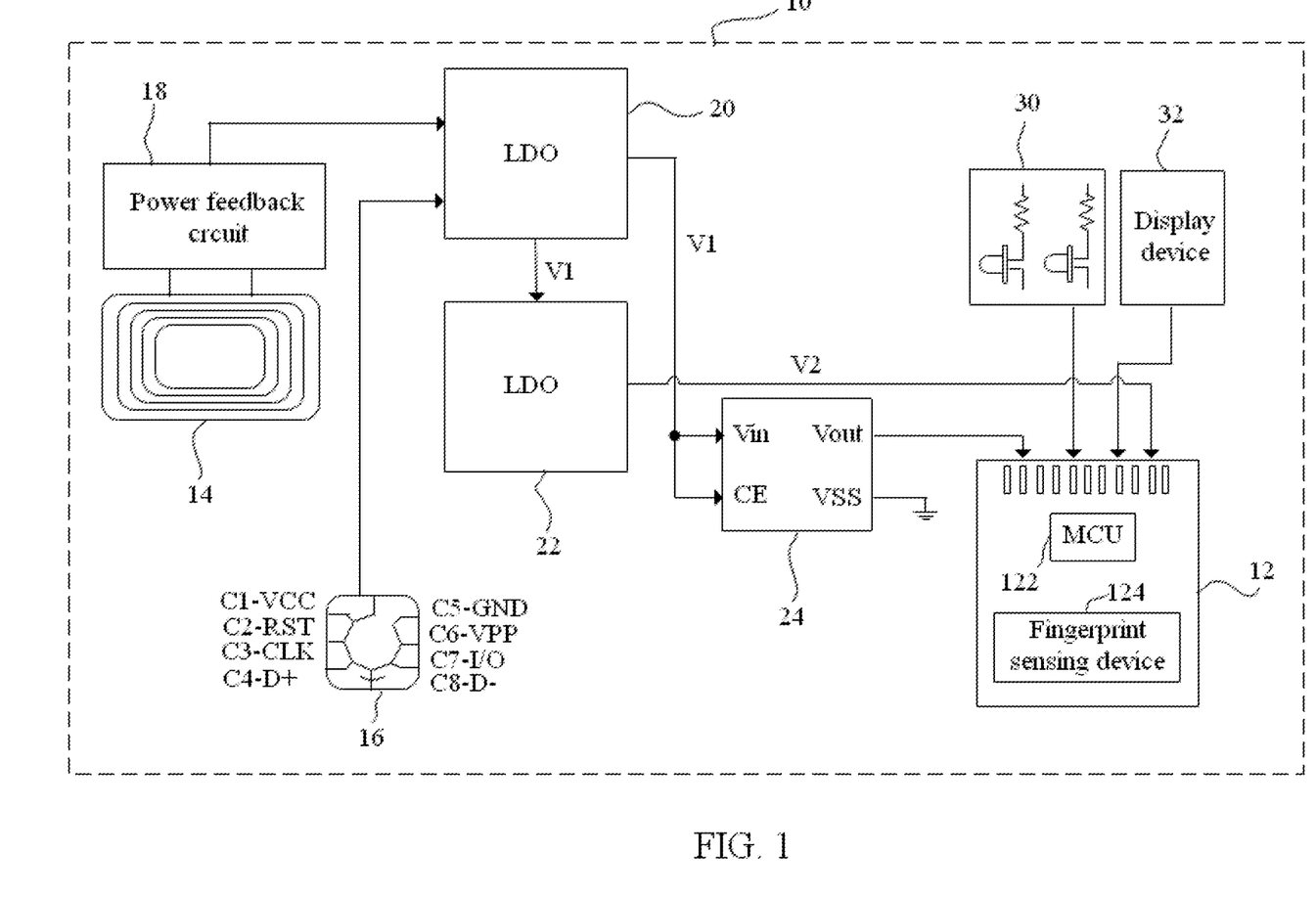
FIG. 1 shows an embodiment of a smart card with a fingerprint sensing system, according to the present invention.

Please refer to FIG. 1, which shows an embodiment of a smart card 10 with a fingerprint sensing system 12, according to the present invention. The smart card 10 is able to sense a coil of another electronic device (such as a card reader) through a near-field communication (NFC) antenna 14 to obtain electrical power for the fingerprint sensing system 12. Alternatively, the smart card 10 can obtain electrical power from a card reader through the chip 16, to supply electrical power to the fingerprint sensing system 12. The NFC antenna 14 provides an alternating current (AC) power, so a power feedback circuit 18 is required to convert an alternating current voltage outputted from the NFC antenna 14 to a direct current (DC) voltage. A low drop out (LDO) 20 can convert a voltage from the chip 16 or the power feedback circuit 18 into a supply voltage V1, and a LDO 22 then converts the supply voltage V1 into a supply voltage V2 and supplies the supply voltage V2 to the fingerprint sensing system 12. The supply voltage V1 is higher than the supply voltage V2. The switch 24 is connected between the LDO 20 and the fingerprint sensing system 12 and configured to determine whether to supply the supply voltage V1 to the fingerprint sensing system 12. The fingerprint sensing system 12 includes a controller 122 and a fingerprint sensing device 124. The fingerprint sensing device 124 is configured to sense a fingerprint, the controller 122 receives the fingerprint data from the fingerprint sensing device 124 and performs a fingerprint enrollment or verification according to the fingerprint data. The controller 122 can control a LED 30 or a display device 32 to generate a visual indication, so that the user can know various states (e.g. fingerprint enrollment succeeds or fingerprint verification fails) during the fingerprint enrollment process or the fingerprint verification process. The display device 32 can be an E-paper or an LCD. In an embodiment, the controller 122 and the fingerprint sensing device 124 are two separate integrated circuit (IC) devices. In other embodiments, the controller 122 and the fingerprint sensing device 124 can be integrated into an IC device.

Figure 2:
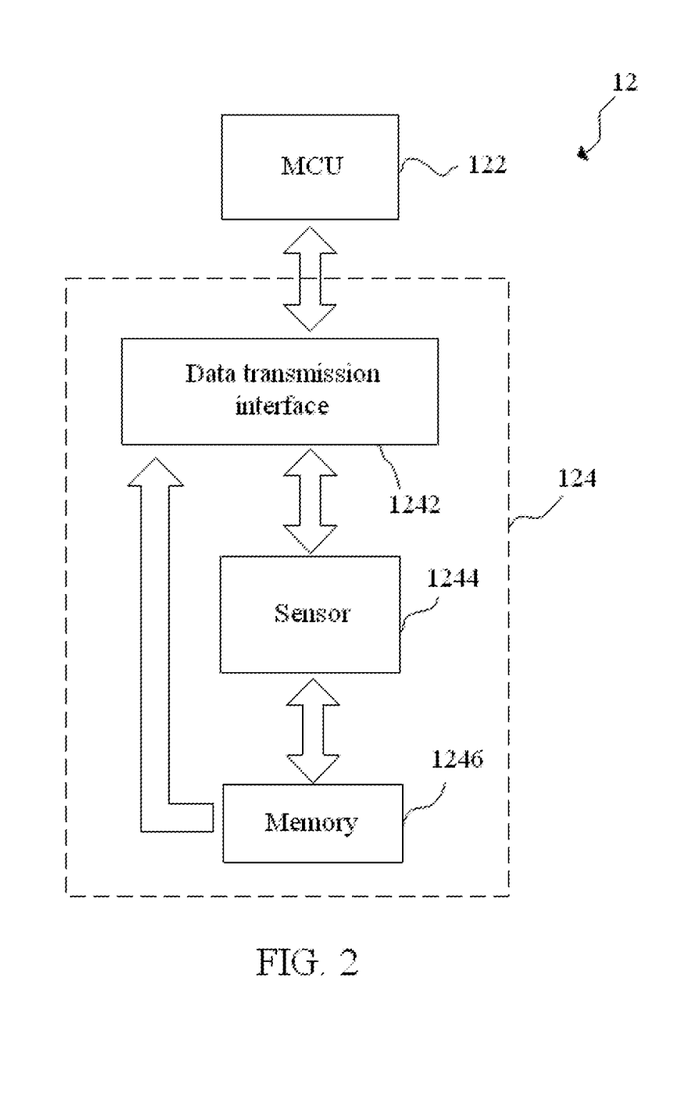
FIG. 2 shows a schematic view of the fingerprint sensing device of FIG. 1, according to the present invention.

Please refer to FIG. 2, which shows a fingerprint sensing device 124 of FIG. 1. The fingerprint sensing device 124 includes a data transmission interface 1242, a sensor 1244 and a memory 1246. The data transmission interface 1242 is connected to the controller 122 and configured to communicate with the controller 122. The sensor 1244 is connected to the data transmission interface 1242 and the memory 1246. The sensor 1244 is configured to sense the fingerprint, and then transmits the sensed data to the controller 122 through the data transmission interface 1242 or stores the sensed data into the memory 1246. The area of the sensor 1244 is smaller than a general finger. The memory 1246 is connected to the data transmission interface 1242 and configured to store the fingerprint data. The type of the memory 1246 is not limited in the present invention, for example, the memory 1246 can be a DRAM. The data transmission interface 1242 is connected to the sensor 1244 and the memory 1246.

Figure 3:
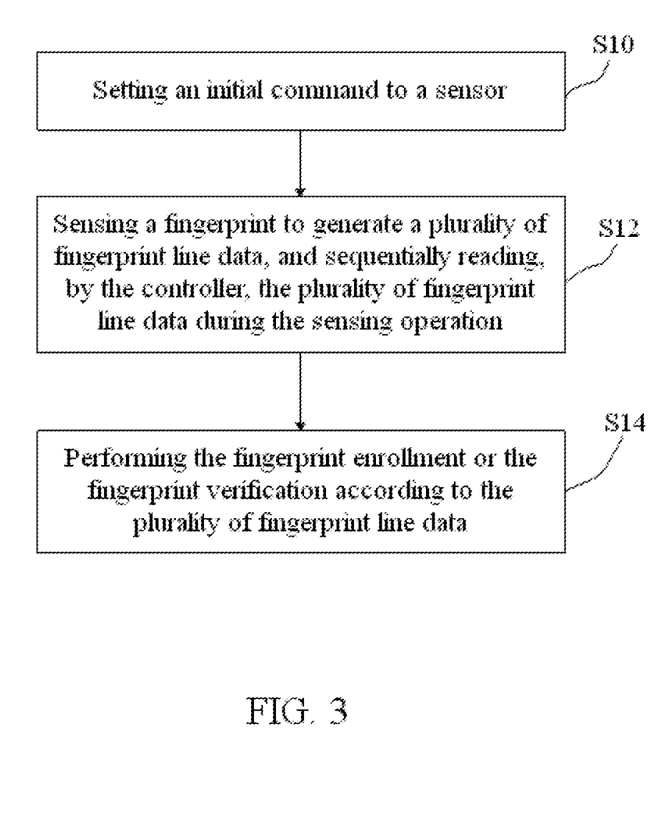
FIG. 3 shows a control method of a fingerprint sensing device in a line mode, according to the present invention.
Figure 4:
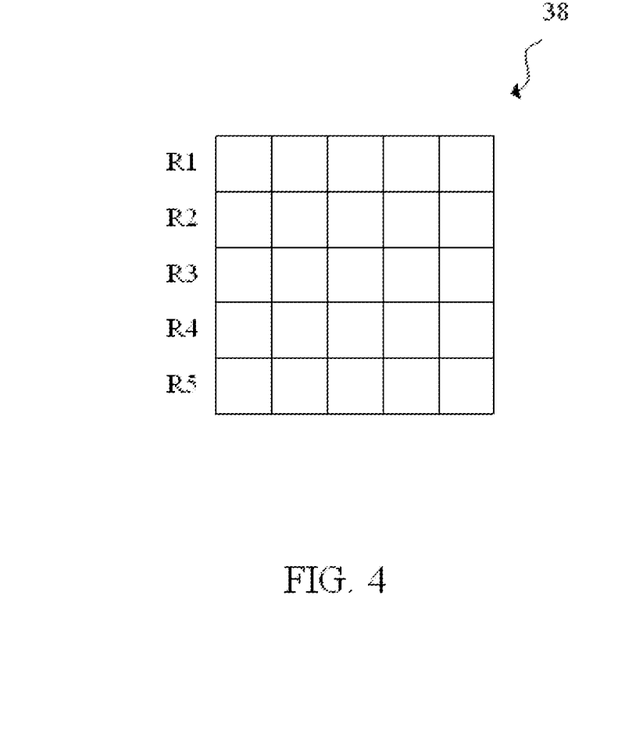
FIG. 4 shows a fingerprint frame data of a frame of fingerprint image, according to the present invention.

The fingerprint sensing system 12 can be operated in a line mode or a frame mode. FIG. 3 shows a flowchart of a control method of the fingerprint sensing system 12 operated in the line mode. First, in a step S10, the controller 122 sets an initial command and transmits the initial command to the sensor 1244 through the data transmission interface 1242, and the sensor 1244 initializes a state thereof according to the initial command. Next, in a step S12, the sensor 1244 senses the fingerprint and stores the fingerprint data in an internal buffer, which is not shown in figures. The capacity of the buffer is small, which can only store a part of the fingerprint data of a fingerprint image. For example, FIG. 4 shows fingerprint frame data 38 of a frame of fingerprint image. The fingerprint frame data 38 includes fingerprint line data R1~R5. The fingerprint frame data 38 is corresponded to a part of the finger and obtained by sensing a user's fingerprint with the sensor 1244. Assuming that the buffer can store only one fingerprint line data at most, after the sensor 1244 obtains the fingerprint line data R1, the sensor 1244 stores the fingerprint line data R1 into a buffer and transmits an interrupt signal to the controller 122. After receiving the interrupt signal, the controller 122 reads the fingerprint line data R1, stored in the buffer, through the data transmission interface 1242. When the controller 122 reads the fingerprint line data R1, the sensor 1244 senses the fingerprint at the same time to obtain the fingerprint line data R2. After the sensor 1244 obtains the fingerprint line data R2 and the controller 122 obtains the fingerprint line data R1, the sensor 1244 stores the fingerprint line data R2 into the buffer to replace the fingerprint line data R1 and transmits an interrupt signal to the controller 122. In responsive to the interrupt signal, the controller 122 reads the fingerprint line data R2. During the period in which the controller 122 reads the fingerprint line data R2, the sensor 1244 senses the fingerprint at the same time to obtain the fingerprint line data R3, and so forth. Therefore, the sensor 1244 can sequentially obtain and store the fingerprint line data R1~R5 in the buffer, and the controller 122 can sequentially read the fingerprint line data R1~R5 from the buffer during the period in which the sensor 1244 senses the fingerprint. After the controller 122 obtains all fingerprint line data R1~R5, a step S14 is executed so that the controller 122 obtains the fingerprint frame data 38 according to the fingerprint line data R1~R5 so as to perform the fingerprint enrollment or the fingerprint verification. In this example, the buffer is designed to store an entire row of the fingerprint line data. However, in other embodiment, upon demand, the buffer can store more or less than one raw of the fingerprint line data depending on a size of the buffer.

Figure 5:
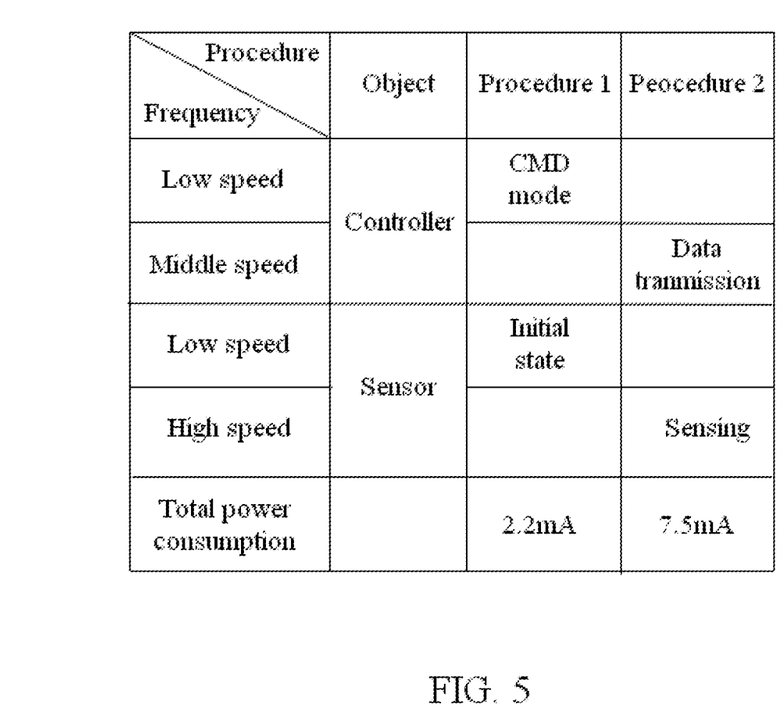
FIG. 5 shows a total power consumption of a controller and a sensor in various procedures in a line mode, according to the present invention.

In the control method of the fingerprint sensing device 124, when the sensor 1244 senses the fingerprint, the controller 122 reads the fingerprint line data at the same time, so the working efficiency is higher. However, it will cause higher power consumption if the controller 122 and the sensor 1244 operate at the same time. Please refer to a table shown in FIG. 5. In a procedure 2 which performs the step S12 of FIG. 3, the controller 122 performs the data transmission to read the fingerprint line data and the sensor 1244 senses the fingerprint. The processing speed of the controller 122 is middle speed (that is, the controller 122 is operated in a middle frequency) and the processing speed of the sensor 1244 is high speed (that is, the sensor 1244 is operated in high frequency). In the case, the controller 122 and the sensor 1244 require high current; as shown in FIG. 5, the total power consumption of the controller 122 and the sensor 1244 is up to 7.5 mA. The low, middle, and high operating frequencies of FIG. 5 are 16 MHz, 32 MHz, and 64 MHz, respectively. When the smart card 10 can obtain sufficient electrical power from the card reader, performing the fingerprint sensing operation in the line mode has high efficiency.

In a condition that the smart card 10 obtains electrical power through wireless induction, the smart card 10 obtains less electrical power from the card reader when the smart card 10 is farther away from the card reader. As shown in the table of FIG. 5, when the smart card 10 is operated in the line mode, the controller 122 and the sensor 1244 being operated at the same time causes very high power consumption. When the user uses the smart card 10 to perform the fingerprint enrollment or verification and the smart card 10 is too far away from the card reader, the controller 122 and the sensor 1244 may not obtain sufficient electrical power to operate at the same time, and it causes inconvenience in use. This problem can be solved by the frame mode of the smart card of the present invention.

Figure 6:
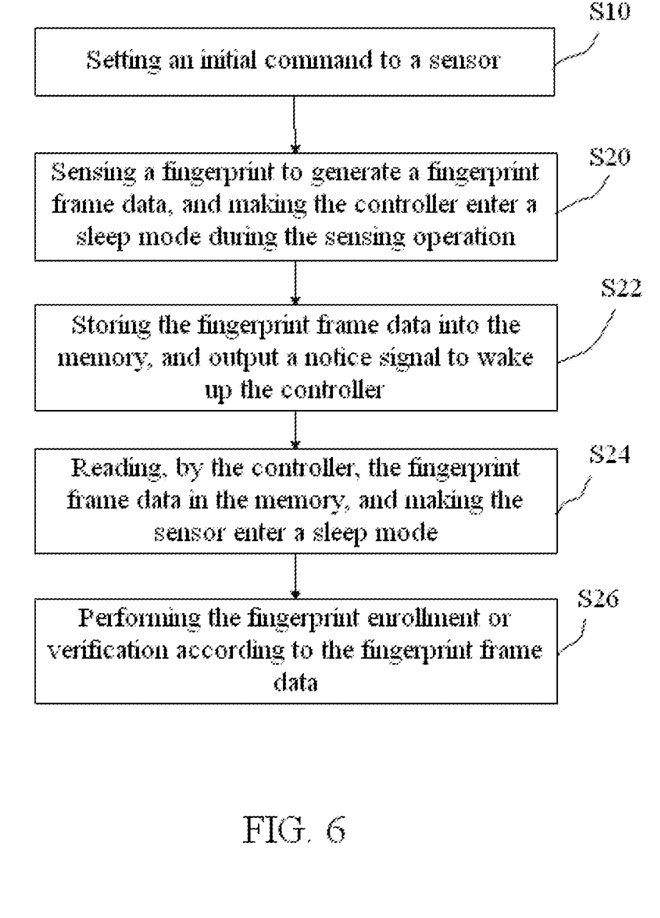
FIG. 6 shows a control method of a fingerprint sensing system of the FIG. 2 in a frame mode, according to the present invention.

Please refer to FIG. 6, which shows a flowchart of the control method of the fingerprint sensing system 12 operating in the frame mode of FIG. 2. In the step S10, the controller 122 sets the initial command, and transmits the initial command to the sensor 1244 through the data transmission interface 1242. The sensor 1244 initializes according to the initial command. After the sensor 1244 initialized, the step S20 is proceeded. In the step S20, the sensor 1244 senses the fingerprint to generate a fingerprint frame data 38, as shown in FIG. 4. When the sensor 1244 senses the fingerprint, the controller 122 enters a sleep mode. After the sensor 1244 generated the fingerprint frame data 38, a step S22 is proceeded. In the step S22, the sensor 1244 stores the fingerprint frame data 38, which is obtained in the step S20, into the memory 1246, and outputs the notice signal to wake up the controller 122. In an embodiment, the notice signal can be an interrupt signal. The controller 122 is awaked by the notice signal. In a step S24, the controller 122 reads the fingerprint frame data 38 stored in the memory 1246 through the data transmission interface 1242. When the controller 122 reads the fingerprint frame data 38, the sensor 1244 enters the sleep mode to stop sensing the fingerprint. In a step S26, the controller 122 performs fingerprint enrollment or verification according to the obtained fingerprint frame data 38. In an embodiment, the sensor 1244 can be a capacitive fingerprint sensor.

In an embodiment, the sensor 1244 has circuits for performing calculation and sensing operations, but does not have a microprocessor. After waking up the sensor 1244 to sense the fingerprint, the controller 122 enters the sleep mode until being awaked by the sensor 1244. After being awaked, the controller 122 transmits a command to make the sensor 1244 enter the sleep mode, and reads the fingerprint frame data stored in the memory 1246. In other embodiments, the sensor 1244 may have a microprocessor. After storing the fingerprint frame data into the memory 1246 and waking up the controller 122, the sensor 1244 enters the sleep mode. The controller 122 is awaked by the sensor 1244 and then read the fingerprint frame data stored in the memory 1246. After obtaining the fingerprint frame data from the memory 1246, the controller 122 wakes up the sensor 1244 to sense the fingerprint and then the controller 122 enters the sleep mode.

As described above, in the frame mode, the controller 122 reads one frame of fingerprint data each time, and in the line mode, the controller 122 reads a row or a part of a frame of fingerprint data each time.

Figure 7:
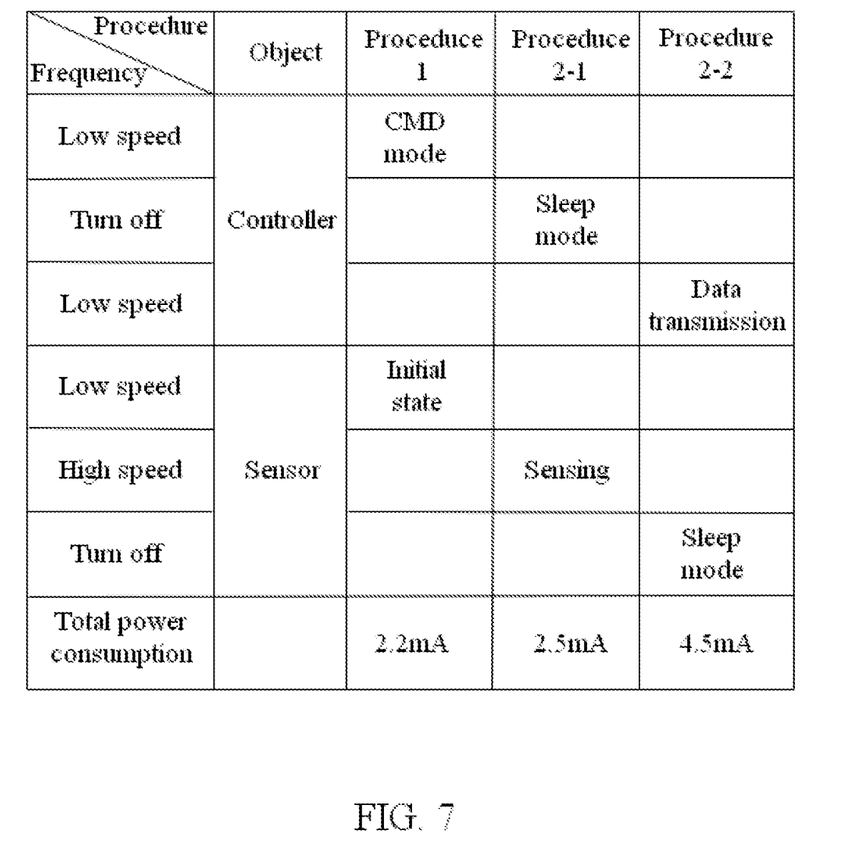
FIG. 7 shows a total power consumption of a controller and a sensor in various procedure in a frame mode, according to the present invention.

Please refer to FIG. 7, which shows power consumption of the controller 122 and the sensor 1244 of FIG. 2 in the frame mode. In a procedure 2-1 which performs the step S20 of FIG. 6, the sensor 1244 senses the fingerprint and the processing speed thereof is high speed (that is, the sensor 1244 is operated in a high frequency) and the controller 122 enters the sleep mode. The total required power consumption in the procedure 2-1 is 2.5 mA only. In a procedure 2-2 which performs the step S24 of FIG. 6, the controller 122 performs data transmission to read the fingerprint frame data in low speed (that is, the controller 122 is operated in low frequency) and the sensor 1244 enters the sleep mode to stop sensing. The total required power consumption in the procedure 2-2 is 4.5 mA. Compared with the procedure 2 in which the controller 122 and the sensor 1244 operate at the same time as shown in FIG. 5, the fingerprint sensing process in the frame mode requires lower current. Accordingly, when the fingerprint sensing system 12 operates in the frame mode, even if the smart card 10 is far away from the card reader, the smart card 10 still can perform the fingerprint enrollment and verification, which has the advantage of high convenience in use. In an embodiment, the low operation frequency in the FIG. 7 can be 16 MHz, and the high operation frequency can be 64 MHz.

Figure 8:
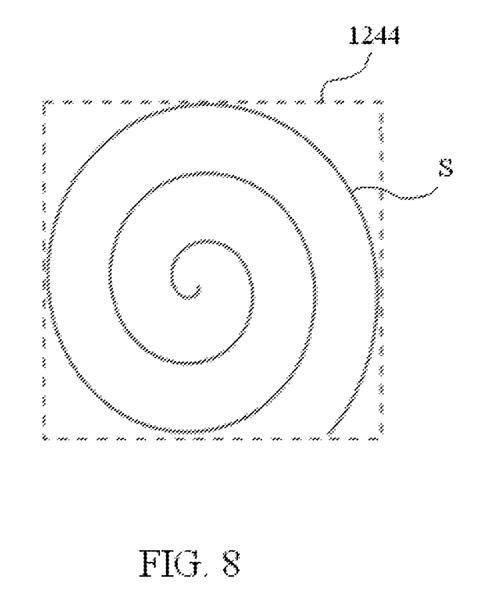
FIG. 8 shows a schematic view of an operation of a spiral enrollment, according to the present invention.

The frame mode mentioned above has the advantage of low power consumption, so that in the frame mode the smart card still can support different fingerprint enrollment method, such as a clicking enrollment method or a spiral enrollment method, in a condition of lower electrical power. The clicking enrollment method requires the user to click the sensor 1244 by finger for many times to obtain a plurality of fingerprint frame data. FIG. 8 shows an embodiment of the spiral enrollment method. A user touches the sensor 1244 by a finger and moves the finger on a clockwise spiral path S from an inside to an outside, such that all regions of the finger pass through the sensor 1244 and the sensor 144 can obtain fingerprint frame data of all regions of the finger. The plurality of fingerprint frame data obtained by the sensor 1244 are used to generate a plurality of fingerprint enrollment data. Compared with the clicking enrollment method, the spiral enrollment method can shorten the time of fingerprint enrollment. The spiral enrollment method requires the sensor 1244 to continuously sense fingerprint. If the fingerprint sensing system 12 is operated in the line mode, the spiral enrollment method consumes more power during the fingerprint sensing operation, so it is hard to perform the spiral enrollment method in a condition that the smart card 10 obtains lower electrical power. However, when the fingerprint sensing system 12 operates in the frame mode, the power consumption is low since the operations of sensing fingerprint and reading the fingerprint frame data by the controller are not performed at the same time. Therefore, the smart card 10 still can use the spiral enrollment method to perform the fingerprint enrollment in a condition of lower electrical power.

One of the features of the frame mode is that the period in which the controller 122 reads the fingerprint data is staggered from the period in which the sensor 1244 senses the fingerprint to reduce the power consumption of the smart card in a specific time interval. Therefore, the spiral enrollment method is still can be applied to perform the fingerprint enrollment even if the smart card 10 is far away from the card reader, thereby improving operational convenience.

Figure 9:
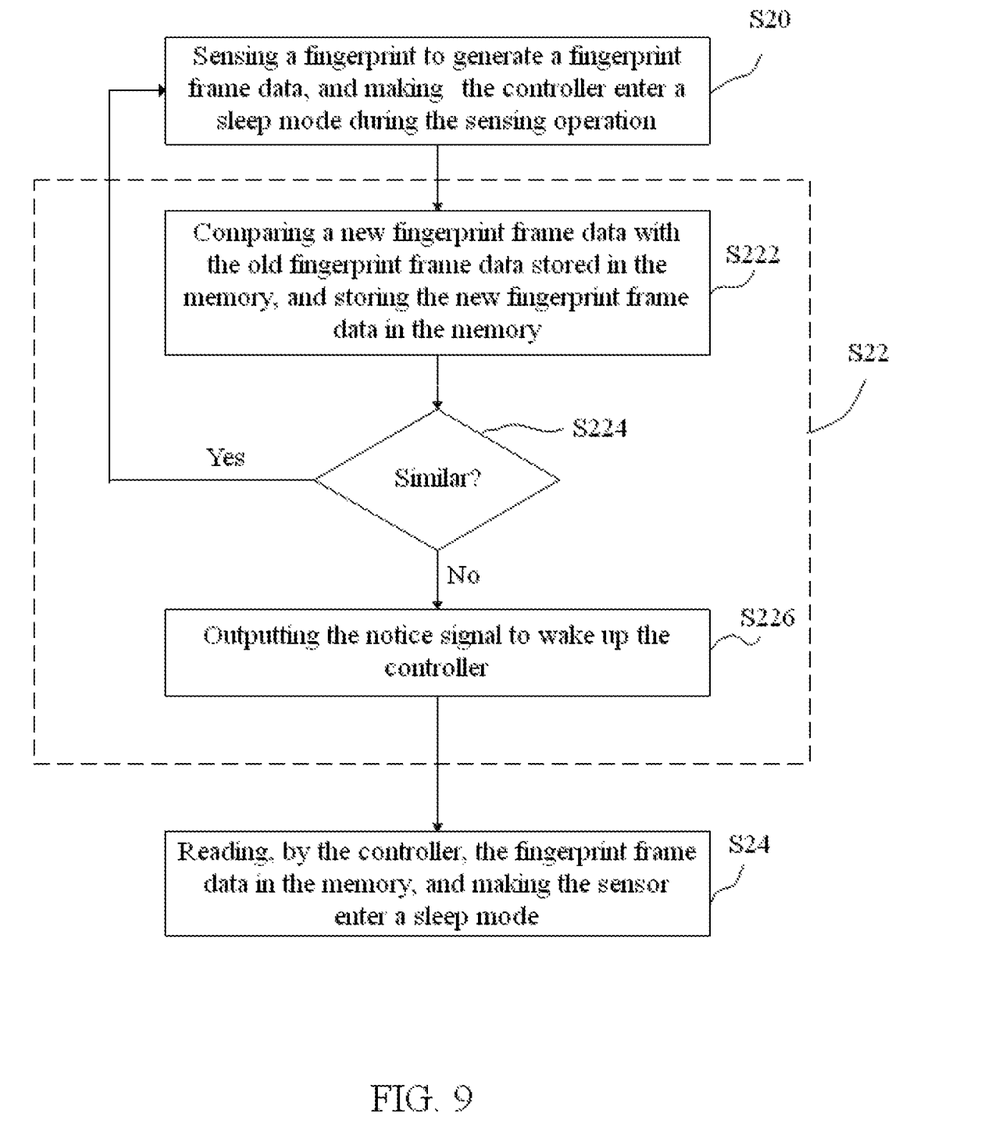
FIG. 9 shows an embodiment of an operation of removing excess data in the step S22 of FIG. 6, according to the present invention.
Figure 10:
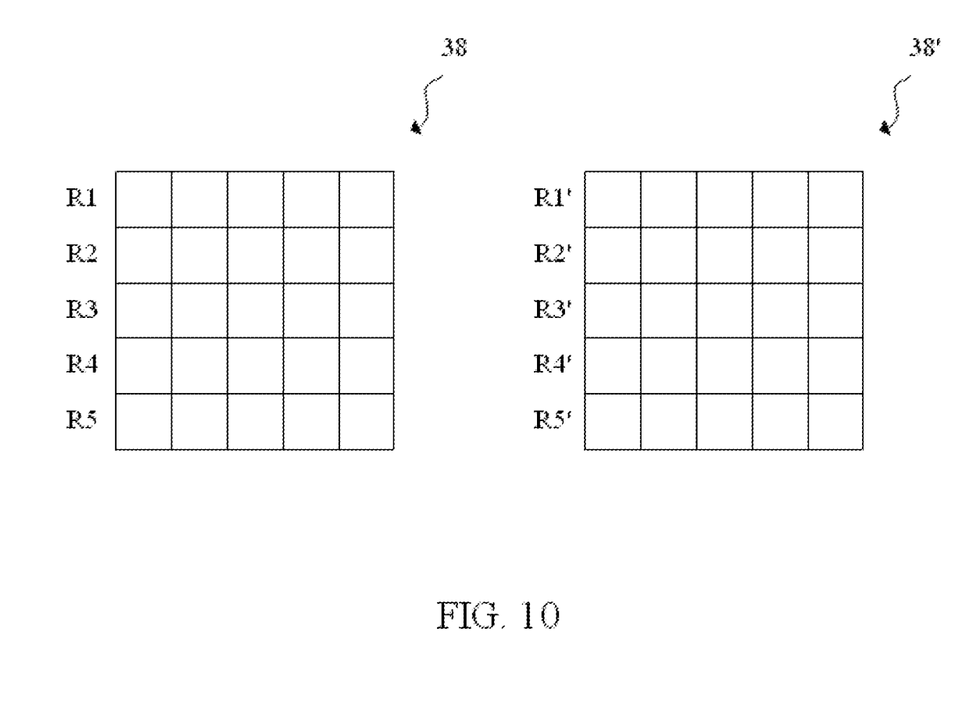
FIG. 10 shows a schematic view of illustrating an operation of the step S222 of FIG. 9, according to the present invention.

In the control method of the frame mode of the present invention, it is possible to store each sensed fingerprint frame data into the memory 1246 for the controller 122 to read, or the controller 122 can just read the fingerprint frame data 38 having lower similarity so as to reduce an amount of the data to be transmitted. Please refer to FIG. 9, shows an embodiment of the step S22 of FIG. 6. In a step S222, the sensor 1244 compares the currently-sensed new fingerprint frame data with the old fingerprint frame data stored in the memory 1246 to generate the degree of similarity, and the new fingerprint frame data is stored into the memory 1246. In an embodiment, the sensor 1244 compares each currently-sensed new fingerprint line data with each the fingerprint line data of the fingerprint frame data stored in the memory 1246. As shown in FIG. 10 which is taken as example, the old fingerprint frame data stored in the memory 1246 is labelled as 38, the currently-sensed new fingerprint frame data obtained by the sensor 1244 is labelled as 38'. When the sensor 1244 obtains the fingerprint line data R1' of the first row, the sensor 1244 also reads the fingerprint line data R1 of the first row of the fingerprint frame data 38 from the memory 1246 and compares the fingerprint line data R1 and R1'. The method for comparing the two fingerprint line data can comprise subtracting a sum of values of the fingerprint line data R1 from a sum of values of the fingerprint line data R1' to obtain a line difference value. When an absolute value of the line difference value is lower than a preset value, a counting value is increased by one. When the absolute value of the line difference value is higher than or equal to the preset value, the counting value is not adjusted. An initial value of the counting value can be 0. When the absolute value of the line difference value is lower than the preset value, it means that the two fingerprint line data R1 and R1' are similar or the same.

The sensor 1244 stores the new fingerprint line data R1' to an address of the fingerprint line data R1 in the memory 1246, that is, the fingerprint line data R1 is replaced by the new fingerprint line data R1'. When the sensor 1244 obtains the fingerprint line data R2' of the second row, the sensor 1244 also reads the fingerprint line data R2 of the second row of the fingerprint frame data 38 from the memory 1246, and compares the fingerprint line data R2' and R2. The sensor 1244 stores the new fingerprint line data R2' to an address of the fingerprint line data R2 in the memory 1246. By the aforementioned manners, the sensor 1244 compares the new fingerprint line data R1'~R5' with the fingerprint line data R1~R5 sequentially to obtain the counting value, and stores the new fingerprint frame data 38' to the memory 1246. In this example, the content stored in the memory 1246 is the latest fingerprint frame data obtained by the sensor 1244. The counting value indicates the degree of similarity between the new fingerprint frame data 38' and the old fingerprint frame data 38. A higher counting value indicates that the fingerprint frame data 38 and 38' are more similar to each other.

Next, in a step S224, the sensor 1244 determines whether the new fingerprint frame data 38' is similar to the old fingerprint frame data 38 according to the counting value. In an embodiment, the sensor 1244 compares the counting value to a threshold which is a positive integer. When the counting value is higher than the threshold, it is determined that the new fingerprint frame data 38' is similar to the old fingerprint frame data 38, and the flow returns to the step S20 to obtain the next fingerprint frame data. When the counting value is lower than the threshold, it is determined that the new fingerprint frame data 38' is not similar to the old fingerprint frame data 38 and the step S226 is performed. In the step S226, the sensor 1244 outputs the notice signal to wake up the controller 122. In an embodiment, the notice signal can be an interrupt signal.

Figure 11:
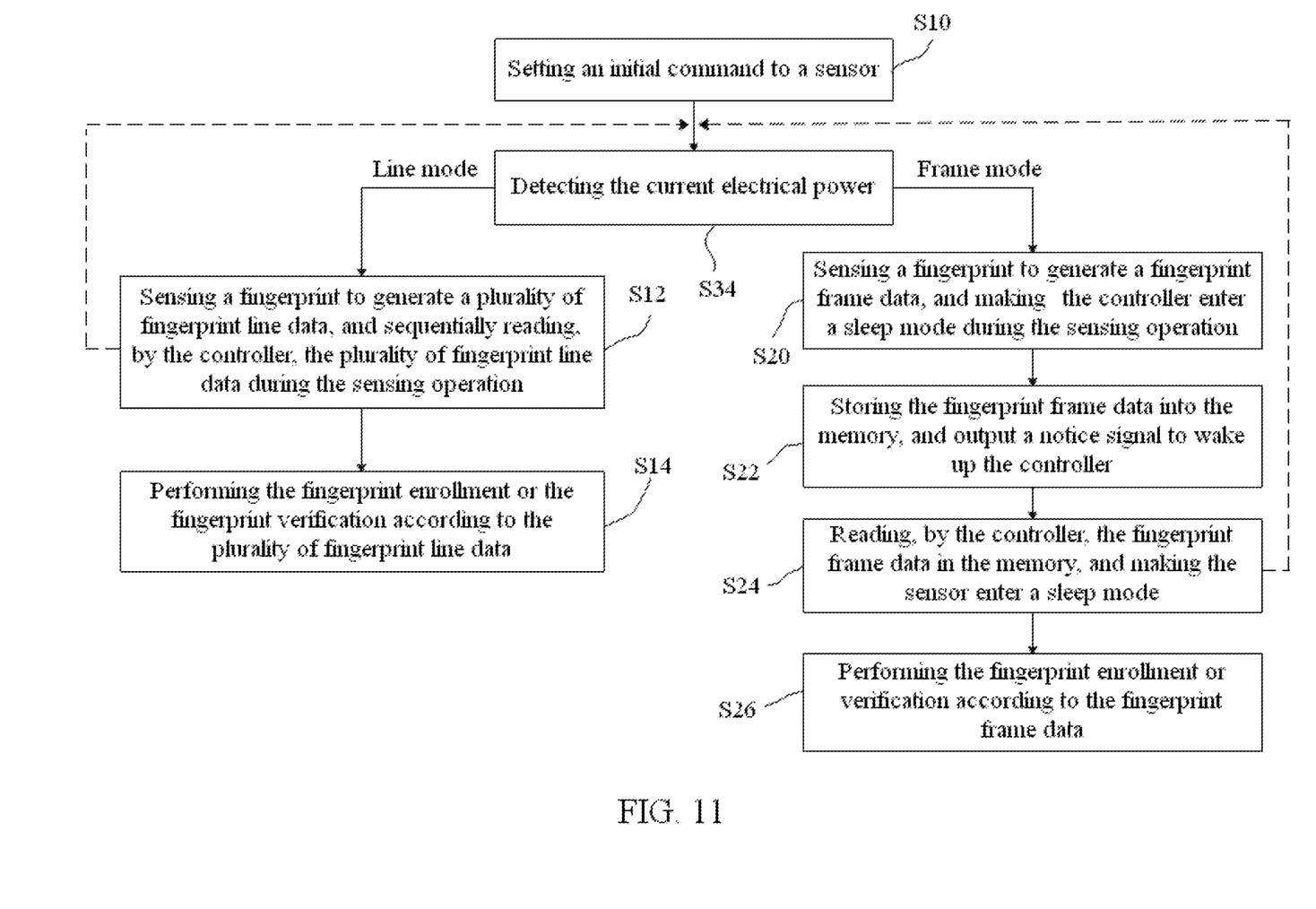
FIG. 11 shows another embodiment of a control method according to the present invention.

The fingerprint sensing system 12 of the present invention can have the frame mode (a first mode) and the line mode (a second mode). The user can select one of the frame mode and the line mode upon their demand. For example, when the user wants higher working efficiency, the user can set the fingerprint sensing system 12 in the line mode, and when the user wants lower power consumption, the user can set the fingerprint sensing system 12 in the frame mode. The operation mode of the fingerprint sensing system 12 can be switched to the line mode or the frame mode according to a current condition. As shown in the control method of the FIG. 11, after the fingerprint sensing system 12 is activated, the step S10 is performed first. The controller 122 sets the initial command and transmits the initial command to the sensor 1244 through the data transmission interface 1242, and the sensor 1244 initializes according to the initialization command. Next, in the step S34, the controller 122 can detect the current electrical power obtained by the smart card 10. When the electrical power is higher than a preset voltage, the fingerprint sensing system 12 enters the line mode to perform the steps S12 and S14 in FIG. 3. When the electrical power is lower than the preset voltage, the fingerprint sensing system 12 enters the frame mode to perform the steps S20, S22, S24 and S26 in FIG. 6. In this embodiment, the step S22 also can perform the operation of comparing similarity between the fingerprint data as shown in FIG. 9. In other embodiments, after the step S12 is completed, the flow returns to the step S34 to determine the electrical power. When the electrical power still is higher than the preset voltage, the fingerprint sensing system 12 is remained in the line mode. When the electrical power becomes lower than the preset voltage, the fingerprint sensing system 12 is switched from the line mode to the frame mode to perform the steps S20, S22, S24, and S26. Similarly, after the step S24 is completed, the flow can return to step S34 to determine the electrical power. When the electrical power still is lower than the preset voltage, the fingerprint sensing system 12 is remained in the frame mode, and when the electrical power becomes higher than the preset voltage, the fingerprint sensing system 12 is switched from the frame mode to the line mode to perform the steps S12 and S14.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A smart card with a fingerprint sensing system, comprising:
    a fingerprint sensing device configured to sense a fingerprint to generate a fingerprint frame data; and a controller connected to the fingerprint sensing device, configured to obtain the fingerprint frame data from the fingerprint sensing device, and configured to perform fingerprint enrollment or verification according to the fingerprint frame data;

wherein in a first mode of the smart card, the fingerprint sensing device stops sensing the fingerprint when the controller reads the fingerprint frame data, or the controller enters a sleep mode when the fingerprint sensing device senses the fingerprint;

wherein the fingerprint sensing device comprises:
- a data transmission interface coupled to the controller and configured to communicate with the controller;
- a sensor coupled to the data transmission interface and configured to sense the fingerprint to generate the fingerprint frame data; and
- a memory coupled to the data transmission interface and the sensor, and configured to store the fingerprint frame data outputted by the sensor;

wherein the controller reads the fingerprint frame data stored in the memory through the data transmission interface, and in the first mode of the smart card, the sensor enters the sleep mode so as to stop sensing the fingerprint when the controller reads the fingerprint frame data;

wherein in the first mode of the smart card, the sensor compares whether a currently-sensed new fingerprint frame data is similar to an old fingerprint frame data stored in the memory, and stores the currently-sensed new fingerprint frame data in the memory;

wherein when the currently-sensed new fingerprint frame data is not similar to the old fingerprint frame data, the sensor outputs a notice signal to the controller, and the controller is woken up in response to the notice signal, and then reads the currently-sensed new fingerprint frame data stored in the memory.

2. The smart card according to claim 1, wherein the sensor is a capacitive fingerprint sensor.

3. The smart card according to claim 1, wherein the controller wakes up the senor after obtaining the fingerprint frame data.

4. The smart card according to claim 1, wherein the notice signal is an interrupt signal.

5. The smart card according to claim 1, wherein the smart card comprises a second mode, and in the second mode, the fingerprint sensing device senses the fingerprint to generate a plurality of fingerprint line data which form the fingerprint frame data, and when the fingerprint sensing device senses the fingerprint, the controller obtains the plurality of fingerprint line data from the fingerprint sensing device.

6. The smart card according to claim 5, wherein the controller determines to operate the smart card in the first mode or the second mode based on a voltage of the smart card.

7. A control method for a smart card with a fingerprint sensing system, wherein the smart card comprises a controller and a fingerprint sensing device, the fingerprint sensing device is configured to sense a fingerprint to generate fingerprint frame data, and the controller is configured to obtain the fingerprint frame data from the fingerprint sensing device and perform a fingerprint enrollment or a verification according to the fingerprint frame data, and the control method comprises:
- storing the fingerprint frame data into a memory for the controller to read; and
- in a first mode of the smart card, when the controller reads the fingerprint frame data, the fingerprint sensing device stops sensing the fingerprint, or when the fingerprint sensing device senses the fingerprint, the controller enters a sleep mode;

wherein the step of storing the fingerprint frame data comprises:
- comparing whether a currently-sensed new fingerprint frame data is similar to an old fingerprint frame data stored in the memory, and storing the currently-sensed new fingerprint frame data in the memory; and
- when the currently-sensed new fingerprint frame data is not similar to the old fingerprint frame data, outputting a notice signal to the controller, wherein the controller is woken up in response to the notice signal, and then reads the currently-sensed new fingerprint frame data stored in the memory.

8. The control method according to claim 7, wherein the notice signal is an interrupt signal.

9. The control method according to claim 7, further comprising:
- in a second mode of the smart card, sensing the fingerprint, by the fingerprint sensing device, to generate a plurality of fingerprint line data which form the fingerprint frame data; and
- when the fingerprint sensing device senses the fingerprint, the controller obtains the plurality of fingerprint line data from the fingerprint sensing device.

10. The control method according to claim 9, further comprising:
- operating the smart card in the first mode or the second mode based on a voltage of the smart card.

11. The control method according to claim 7, wherein the fingerprint sensing device comprises a data transmission interface coupled to the controller and configured to communicate with the controller, a sensor coupled to the data transmission interface and configured to sense the fingerprint to generate the fingerprint frame data, and a memory coupled to the data transmission interface and the sensor and configured to store the fingerprint frame data outputted by the sensor, wherein the control method comprises:
- reading, by the controller, the fingerprint frame data in the memory through the data transmission interface, and in the first mode of the smart card, making the sensor enter the sleep mode to stop sensing the fingerprint when the controller reads the fingerprint frame data.

12. The control method according to claim 11, further comprising:
- waking up the sensor after the controller obtains the fingerprint frame data.

\* \* \* \* \*